UNITED STATES PATENT OFFICE.

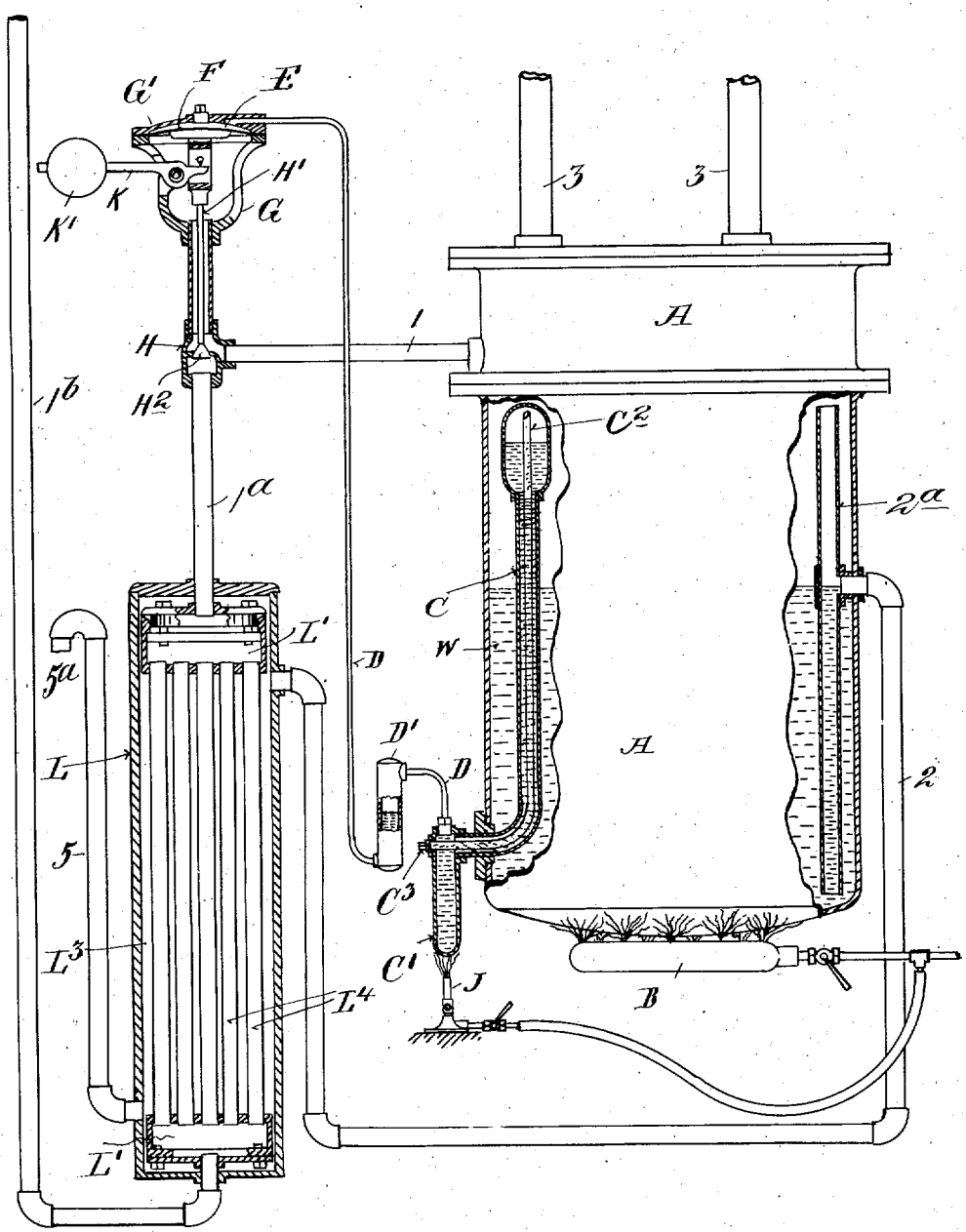

ADDISON G. WATERHOUSE, OF NEW YORK, N. Y., ASSIGNOR TO THEODORE F. BOURNE, TRUSTEE, OF MONTCLAIR, NEW JERSEY.

METHOD OF AND APPARATUS FOR THERMAL REGULATION.

973,150. Specification of Letters Patent. Patented Oct. 18, 1910.

Application filed November 29, 1909. Serial No. 530,295.

*To all whom it may concern:*

Be it known that I, ADDISON G. WATERHOUSE, a citizen of the United States, and resident of New York city, borough of the Bronx, in the county of New York and State of New York, have invented certain new and useful Improvements in Methods of and Apparatus for Thermal Regulation, of which the following is a specification.

For various purposes, such as for distillation, evaporation or other treatment of liquids by heat, it is frequently desirable to maintain the liquid at a substantially predetermined temperature for a suitable period of time, or during its flow, either continuously or intermittently, through a suitable heater or boiler. For such purpose a confined material, such as alcohol, that boils at a temperature below the temperature of the liquid being treated, has been placed in thermal relation to such liquid, whereby the temperature of such treated liquid imparts to such volatile material a pressure capable of governing a valve which controls the flow of liquid to and from such heater or boiler. But such volatile material depends wholly for its action upon the temperature of the liquid being treated, and is subject to disturbing influences, whereby the regulation of the flow of the liquid to be treated may vary within a wider range than may be desired.

The object of my invention is to provide improved means for regulating the flow of liquid to and from a place where the same is to be treated and its temperature maintained within a substantially predetermined range, which means will not be materially affected by disturbing influences, and whereby the pressure generated for performing work, such as for controlling the flow of fluid, may be readily determined and controlled in accordance with the range of desired temperature of the liquid being treated.

In carrying out my invention I provide a chamber in operative communication with a movable member, such as a diaphragm or piston, adapted for operating a valve or performing other mechanical work, which chamber is more or less filled with a desired fluid, such as one having a constant condition, such as water, and placed in thermal communication with the fluid the temperature of which is to be controlled or limited, with means for applying heat directly to said chamber independent of the temperature of the fluid with which such chamber is in thermal relation, whereby the temperature of the water or fluid within said chamber is raised above the temperature of the fluid that is in thermal relation therewith and the temperature of which is to be regulated or limited, which increased temperature is utilized to control the flow of the fluid being treated or performing other mechanical work.

My invention also comprises novel details of improvement that will be more fully hereinafter set forth and then pointed out in the claims.

In the accompanying drawing, forming part hereof, I have illustrated my invention capable of use for distillation in a continuous manner of desired properties more volatile than the liquid containing the same, such as the production of alcohol from a wash or mash, and wherein the residual liquid is caused to flow from the heater or boiler after alcohol has been evaporated therefrom, it being understood that my invention is equally applicable for use in controlling the temperature of liquid containing other desired properties to be obtained by distillation or evaporation, also for sterilization of liquids and analogous purposes, or for raising such liquid to and maintaining it at any predetermined temperature, such as may be required for hot-water heaters used for domestic purposes.

At A is indicated a boiler or heater, which may be of any suitable or well known construction, the same being shown provided with an inlet pipe 1 and an outlet pipe 2, the products of distillation being carried off through one or more pipes 3, or in any suitable manner. Heat may be applied to boiler A by burner B, or in any well known manner.

My improvements are shown as adapted for controlling the flow of liquid to and from boiler or heater A, although my improvements may be used for doing other work, such as for controlling the flow of gas for heating the boiler, or for regulating condensation of the products of distillation.

As illustrated, my improvements are adapted to cause the fluid in the boiler to be maintained at a substantially predetermined or constant temperature within a desired range, and comprise means for maintaining a closed body of fluid in thermal relation to the fluid in the boiler, means for heating said closed body of fluid above the temperature of the fluid in the boiler, and means for employing the pressure of steam or vapor generated from such closed body of fluid for controlling the flow of the fluid to and from the boiler A. To this end I have shown a thermo-dynamic regulator comprising a chamber or tube C shown located within boiler A and having an extension or exterior part C', and a conduit or pipe D. Pipe D communicates with a chamber or recess E located at one side of a movable member, such as a diaphragm F. Such diaphragm is shown beneath the cap G' of the casing G, which diaphragm acts upon the stem H' of the movable member H² of valve H. Valve H is shown located in the line of pipe 1, 1ª through which fluid flows into boiler A, although said valve can, if preferred, be located in the line of the discharge pipe 2. Suitable fluid, such as water, or that which may have a boiling point which is the same or above that of the fluid W being treated, is placed in chamber C, or a part thereof, so that the fluid in said chamber will be in thermal contact with or relation to the fluid W in boiler or heater A, whereby the heat of the fluid W will control the temperature of the fluid or vapor in chamber C. Heat is applied to the fluid in chamber C independent of the fluid in boiler A, for which purpose, as shown, heat is applied to extension C', exterior to boiler or heater A. I have shown a gas burner J for applying heat to extension C', although it will be understood that heat from the source B may be applied to extension C', if preferred, as by placing said extension within the zone of the heat of B, or in other suitable manner. The heat represented by J, I term, for convenience, an auxiliary heater. I am thus enabled to apply a constant or standard heat to the fluid in the thermal-regulator irrespective of the termal relation thereto of heat from the fluid in or derived from boiler A, whereby such heat applied to chamber or extension C' increases the temperature of the fluid therein slightly above the temperature of the fluid W in boiler A, so that such temperature increased above the temperature of the fluid in the boiler may generate vapor or steam in the thermo-regulator at a pressure which the fluid in boiler A would not produce, and such pressure is transmitted through the pipe or tube D, or by other means of transmission, to chamber E to act upon or bulge diaphragm F and open valve H.

It will be understood that as fluid in chamber C is in thermal relation to the fluid W in boiler A the latter fluid has a modifying effect upon the heat applied at J, serving to prevent a temperature in the thermal-regulator that would be excessive or beyond that desired, for as the heat is communicated from J to the fluid in the extension C' such fluid is prevented from rising too high in temperature by the thermal relation thereto of the fluid W in the boiler, according to the amount of heat applied at J. A pressure in the thermal regulator dependent upon its confined fluid reaching its boiling point may thus be obtained or prevented to any desired extent.

An advantage of my invention is that by supplying the thermal regulator with fluid having a boiling point at or above that of the fluid W in the boiler a relatively moderate heat applied at J may be utilized to cause a relatively slight pressure upon the piston or diaphragm. For instance, if a fluid having a boiling point at or about 212° F. is treated in the boiler and a corresponding fluid is placed in the thermal-regulator, a temperature in the regulator may be produced by the heat applied thereto at J which is above the temperature attainable by the fluid W in the boiler so as to create a pressure at the diaphragm while the temperature of the fluid W in the boiler is just below its boiling point, and at which temperature such fluid W is to be maintained. Hence, to prevent the fluid W in the boiler from rising to its boiling point, the pressure in the regulator derived by reason of the heat at J will control the valve, for such temperature preponderating over any temperature that can be imparted to the regulator by the fluid W in the boiler, beyond the limit to which fluid W can or should be raised, is depended upon to regulate the flow of the fluid W as distinguished from a pressure that only can be generated from the heat of the fluid W in the absence of auxiliary heat applied to the regulator. Increase or decrease of the heat J will cause a corresponding pressure in chamber E to work the valve H, and the valve in turn will change the rate at which the supply and discharge of fluid W is regulated, and this rate determines the temperature to which the fluid W is raised, which temperature in return modifies the effect of the heat J. Therefore, by changing or adjusting the heat J a corresponding effect will follow in the temperature of fluid W, which can be brought to and maintained at any temperature required by such an adjustment of heat J. Pressure upon the diaphragm is counteracted or permitted to act by any suitable means, such as a weighted lever K that acts upon stem H' to normally keep valve H closed. The weight K' may be adjusted upon lever K to coact with the pressure in the regulator in such manner that any increase of pressure in chamber E, occurring with the rise of temperature of fluid W in the boiler, will cause the opening of valve H to admit fresh fluid to boiler A until the temperature of the fluid therein is reduced to such an extent as will cause a corresponding reduction of temperature and pressure in the regulator to permit closing of valve H, and so on, or the weight being constant the heat at J may be tempered with a like result, whereby the temperature of the fluid in boiler A is maintained at a substantially predetermined degree or within a desired range of such temperature. I am thus enabled to limit the heat of the fluid in the boiler within a relatively small range of any desired temperature. Such governing or controlling of the flow of the fluid through the boiler and its temperature therein is adapted to be effected by reason of the fact that the controllable heat at J enables the production of a pressure at the mechanical part that operates the valve in excess of such pressure as can be produced by the temperature of the fluid being treated owing to such fluid being limited in temperature by the escape of heat of vaporization.

While I have shown my improvements as applicable to governing the valve that controls the flow of fluid through the boiler, it will be understood that the same arrangement can be used to control gas or steam to supply heat for the boiler, or to control an electric current which may be used for heating the regulator or producing the auxiliary heat at J, or to control the temperature of a condenser, or for doing any other work desired.

I have shown an enlargement D' of pipe D, such as a chamber, adapted to trap air that may escape from fluid therein. It is preferable that pipes C, C' and D be exhausted practically of air, which may be done by charging the pipes full of fluid. To accomplish this conveniently tube $C^2$ may be placed within pipe C and provided with a screw plug $C^3$, whereby when the pipes are charged the air passes out through $C^2$ at the plug orifice. The outflow of fluid through pipe 2 may be governed in any suitable manner to maintain a desired level, as by an ordinary ball valve. I have shown a pipe $2^a$, open at both ends above and below the level of fluid W in boiler A, connected with pipe 2, whereby the fluid will flow out through the lower end of pipe $2^a$ to the exclusion of material upon the surface of the liquid W which it may be desirable to retain in the boiler, and the open upper end of pipe $2^a$ prevents syphoning through pipe 2.

In order to preheat the fluid flowing through the boiler and conserve the heat that would be carried off by the discharge fluid, I have shown a heat exchange indicated generally at L. The heat exchange shown comprises a casing provided with two thermally contiguous passages. The passage L' shown having pipes $L^4$ is connected with inlet pipe $1^b$ and pipe $1^a$, and the other passage $L^3$ is connected with discharge pipe 2 and outlet pipe 5, the discharge opening $5^a$ of pipe 5 being sufficiently high to maintain a desired level of fluid in the heat exchange. Thus, the heated discharge fluid from boiler A passes through chamber $L^3$ and imparts heat to the juxtaposed cold inflowing fluid so that the supply fluid enters the boiler in a heated condition and the heat of the discharge fluid is conserved.

By preheating the inflowing fluid its temperature may be so near the temperature of the fluid being treated in the boiler as to have a very slight effect upon the same, so that any adjustment to which my improved regulator is capable of being set, due to an independent source of heat applied thereto, would cause a correspondingly constant effect on the temperature of the liquid being treated.

My invention is not limited to the details of construction set forth, as changes may be made, within the scope of the appended claims, without departing from the spirit of my invention.

Having now described my invention what I claim is:—

1. The method of treating fluid consisting in heating such fluid, confining separate fluid in thermal relation to and heating it by the first named fluid, changing the temperature of said confined fluid by means independent of the temperature imparted to it by the first named fluid, and maintaining said fluids at different temperatures and thereby causing said confined fluid to effect regulation of the first named fluid.

2. The method of treating fluid consisting in heating such fluid, confining separate fluid in thermal relation to the first named fluid, applying auxiliary heat to the confined fluid, and causing said confined fluid to effect regulation of the first named fluid.

3. The method of treating fluid consisting in heating said fluid, confining separate fluid in thermal relation to the first named fluid, applying independent heat to and raising the temperature of said confined fluid above the temperature of the first named fluid, and causing the confined fluid to effect regulation of the first named fluid.

4. The method of controlling the flow of fluid consisting in heating such fluid to a substantially predetermined range, confining separate fluid in thermal relation to the first named fluid, applying auxiliary heat to said confined fluid, and causing the pressure of such confined fluid to regulate the flow of the first named fluid.

5. The method of controlling the flow of fluid consisting in heating such fluid to a substantially predetermined range, confining separate fluid in thermal relation to the first named fluid, raising the temperature of said confined fluid higher than the temperature of the first named fluid, and causing the pressure of said confined fluid to regulate the flow of the first named fluid.

6. The method of controlling the flow and temperature of fluid consisting in heating such fluid to a substantially predetermined range, confining separate fluid in thermal relation to the first named fluid, increasing the heat of said confined fluid above the the heat of the first named fluid, and causing the pressure of the confined fluid to control the flow of the first named fluid.

7. The method of treating fluid consisting in heating such fluid, confining separate fluid having a boiling point not less than the boiling point of the first named fluid in thermal relation thereto, raising the temperature of said confined fluid higher than the temperature of the first named fluid and causing the pressure of said confined fluid to effect regulation of the first named fluid.

8. The method of treating fluid consisting in applying heat to a body of fluid, causing heated discharge fluid to transmit heat to juxtaposed supply fluid, confining separate fluid in thermal relation to the first named fluid, changing the temperature of said confined fluid from that of the temperature of said body of fluid, and causing said confined fluid to regulate the flow of the first named fluid.

9. The method of treating fluid consisting in heating such fluid, confining separate fluid in thermal relation to the first named fluid, applying auxiliary heat to the confined fluid, maintaining such auxiliary heat applied to said fluid, and utilizing such auxiliary heat applied to said confined fluid to aid said first named fluid in effecting regulation of itself.

10. The method of treating fluid consisting in applying heat to fluid in transit, causing such fluid while being discharged to transmit heat to the fluid being supplied, confining separate fluid in thermal relation to the first named fluid, raising the temperature of said confined fluid above that of the first named fluid and causing said confined fluid to regulate the work of maintaining such first named fluid at a predetermined temperature.

11. In a thermo-dynamic regulator, the combination of a fluid container, a thermo-actuator in thermal relation to said container, means for raising said thermo-actuator to a temperature greater than that applied to it by said container, and means controlled by said thermo-actuator for performing work.

12. A thermo-dynamic regulator comprising a fluid container, a chamber in thermal relation to the container, fluid within said chamber, means to apply heat to said chamber to raise its temperature above the heat applied to it by said container, and a movable member associated with said chamber.

13. A thermo-dynamic regulator comprising a fluid container, a chamber having a portion located within the heater and a portion extending without the container, means to apply heat to the exterior portion of said chamber independent of the heat applied to the chamber by the container, and a movable member associated with said chamber.

14. The combination of a heater having inlet and outlet passages, a valve to control one of said passages, a movable member to control said valve, a closed chamber having a portion within said heater in thermal relation to fluid therein and having another portion in communication with said movable member, said chamber having a portion exterior to the heater, and means for applying heat to said exterior portion of the chamber independent of the heat applied to the portion of the chamber within the heater.

15. The combination of a fluid container, a thermo-dynamic actuator in thermal relation to and heated by said container, means independent of said fluid container for changing the temperature of said actuator while it is being heated by said container from that imparted to it by the heat from said container, and a movable member associated with said actuator.

16. The combination of a fluid container, a valve to control the supply of fluid thereto, a movable member associated with said valve, a thermo-actuator to control said member and in thermal relation to said container, and means independent of said fluid container for changing the temperature of said actuator while it is being heated by said container from the temperature imparted to it by the heat from the fluid in said container.

17. The combination of a fluid container, a valve to control the supply of fluid thereto, a movable member associated with said valve, a thermo-actuator to control said member and in thermal relation to said container, and means to apply auxiliary heat to said actuator.

18. The combination of a fluid container, a fluid chamber having a portion in thermal relation to said container, a pipe within said chamber in open communication with an upper portion thereof, a controllable outlet for said pipe, and a movable member in communication with said chamber and controlled by pressure in said chamber.

19. The combination of a heat exchange having thermally contiguous passages, a fluid container communicating with said passages, a valve to control one of said passages, a movable member to control said valve, a thermo-dynamic actuator to control said member and in thermal relation to said container, and means to apply auxiliary heat to said actuator.

20. The combination of a heat exchange having thermally contiguous passages, and a heater communicating with said passages, a thermo-dynamic regulator, means to apply auxiliary heat to said regulator, a valve to control the flow of fluid to the apparatus, and means to operate said valve by said regulator.

21. The combination of a fluid container, a thermo-dynamic regulator comprising an upwardly disposed chamber containing fluid, the upper portion of which fluid is in thermal relation to heated fluid in said container, means for applying heat to the lower portion of said chamber additional to the heat applied to said chamber owing to its said thermal relation to said container, whereby vapor is generated from the fluid in said chamber to ascend therein, and means for employing the pressure of said vapor for controlling the temperature of the fluid in said container.

22. The combination of a fluid container, means to heat fluid therein, a fluid chamber in thermal relation to said fluid container, means for applying heat to the fluid in said chamber below the level at which heat is communicated to said chamber from said container, and means for employing the resultant effect of the thermo-dynamic force of heat applied to the fluid in said chamber from both of such heat sources for controlling the temperature of the fluid in said container.

23. A thermo-dynamic regulator comprising a chamber containing fluid, means for applying heat of different temperatures simultaneously to two separate portions of the fluid in said chamber, means for causing the resultant pressure of the vapor generated in said chamber by the heat applied to one portion of it as modified by the temperature of another portion of the same to control the temperature of the heat applied to one of the portions of said chamber and means to control separately different heats applied to said chamber.

Signed at New York city, in the county of New York, and State of New York, this 27th day of November, A. D. 1909.

ADDISON G. WATERHOUSE.

Witnesses:
  T. F. BOURNE,
  MARIE F. WAINRIGHT.

---

It is hereby certified that in Letters Patent No. 973,150, granted October 18, 1910, upon the application of Addison G. Waterhouse, of New York, N. Y., for an improvement in "Methods of and Apparatus for Thermal Regulation," an error appears in the printed specification requiring correction as follows: Page 4, line 72, for the word "heater" read *container;* and that the proper corrections have been made in the files and records of the Patent Office and are hereby made in said Letters Patent.

Signed and sealed this 8th day of November, A. D., 1910.

[SEAL.]

E. B. MOORE,
*Commissioner of Patents.* valve, a thermo-dynamic actuator to control said member and in thermal relation to said container, and means to apply auxiliary heat to said actuator.

20. The combination of a heat exchange having thermally contiguous passages, and a heater communicating with said passages, a thermo-dynamic regulator, means to apply auxiliary heat to said regulator, a valve to control the flow of fluid to the apparatus, and means to operate said valve by said regulator.

21. The combination of a fluid container, a thermo-dynamic regulator comprising an upwardly disposed chamber containing fluid, the upper portion of which fluid is in thermal relation to heated fluid in said container, means for applying heat to the lower portion of said chamber additional to the heat applied to said chamber owing to its said thermal relation to said container, whereby vapor is generated from the fluid in said chamber to ascend therein, and means for employing the pressure of said vapor for controlling the temperature of the fluid in said container.

22. The combination of a fluid container, means to heat fluid therein, a fluid chamber in thermal relation to said fluid container, means for applying heat to the fluid in said chamber below the level at which heat is communicated to said chamber from said container, and means for employing the resultant effect of the thermo-dynamic force of heat applied to the fluid in said chamber from both of such heat sources for controlling the temperature of the fluid in said container.

23. A thermo-dynamic regulator comprising a chamber containing fluid, means for applying heat of different temperatures simultaneously to two separate portions of the fluid in said chamber, means for causing the resultant pressure of the vapor generated in said chamber by the heat applied to one portion of it as modified by the temperature of another portion of the same to control the temperature of the heat applied to one of the portions of said chamber and means to control separately different heats applied to said chamber.

Signed at New York city, in the county of New York, and State of New York, this 27th day of November, A. D. 1909.

ADDISON G. WATERHOUSE.

Witnesses:
T. F. BOURNE,
MARIE F. WAINRIGHT.

---

It is hereby certified that in Letters Patent No. 973,150, granted October 18, 1910, upon the application of Addison G. Waterhouse, of New York, N. Y., for an improvement in "Methods of and Apparatus for Thermal Regulation," an error appears in the printed specification requiring correction as follows: Page 4, line 72, for the word "heater" read *container;* and that the proper corrections have been made in the files and records of the Patent Office and are hereby made in said Letters Patent.

Signed and sealed this 8th day of November, A. D., 1910.

[SEAL.]

E. B. MOORE,
*Commissioner of Patents.*

It is hereby certified that in Letters Patent No. 973,150, granted October 18, 1910, upon the application of Addison G. Waterhouse, of New York, N. Y., for an improvement in "Methods of and Apparatus for Thermal Regulation," an error appears in the printed specification requiring correction as follows: Page 4, line 72, for the word "heater" read *container;* and that the proper corrections have been made in the files and records of the Patent Office and are hereby made in said Letters Patent.

Signed and sealed this 8th day of November, A. D., 1910.

[SEAL.]

E. B. MOORE,
*Commissioner of Patents.*